United States Patent [19]
Hancock et al.

[11] Patent Number: 5,679,478
[45] Date of Patent: Oct. 21, 1997

[54] RESERVE BATTERY HAVING SIMPLIFIED CONSTRUCTION AND IMPROVED RANGE OF OPERATION

[75] Inventors: Keith Alan Hancock, Castle Rock, Colo.; Thomas Augusto Gutierrez, Laguna Niguel, Calif.; Jeffrey Michael Kalman, Cleveland Heights; Nicholas Emile Stanca, Westlake, both of Ohio

[73] Assignee: Reserve Battery Cell, L.P., Englewood, Colo.

[21] Appl. No.: 600,552

[22] Filed: Feb. 13, 1996

[51] Int. Cl.$^6$ .................................................. H01M 6/32
[52] U.S. Cl. .................................................. 429/63; 429/113
[58] Field of Search ...................................... 429/113, 114, 429/116, 52, 63

[56] References Cited

U.S. PATENT DOCUMENTS

| | | | |
|---|---|---|---|
| 4,288,501 | 9/1981 | Moody | 429/70 |
| 4,642,275 | 2/1987 | Smith et al. | 429/52 |
| 4,650,732 | 3/1987 | Weber | 429/120 |
| 4,699,854 | 10/1987 | Snyder | 429/114 |
| 4,794,058 | 12/1988 | Thiess | 429/116 |
| 4,803,924 | 2/1989 | Von Sloun | 102/293 |
| 4,925,750 | 5/1990 | Theiss | 429/116 |
| 4,948,683 | 8/1990 | Picozzi et al. | 429/90 |
| 5,196,276 | 3/1993 | Niksa et al. | 429/52 |

*Primary Examiner*—M. Nuzzolillo
*Attorney, Agent, or Firm*—Duft, Graziano & Forest, PC

[57] ABSTRACT

A reserve, energy sourced, or deferred action battery in which each battery cell is provided a separate reservoir containing the necessary electrolyte fluid for that cell. A simple design is then possible as the electrolyte fluid is stored in close proximity to the battery cells when needed at the time of activating the battery. A combination of two electrolyte fluids may be used that react exothermically when mixed together at the time of activation thereby producing heat. The production of heat allows the battery to activate at existing cold ambient temperatures that would otherwise render the reserve battery without sufficient operating power. The invention also provides an activation system which ensures reliable activation of the battery and ensures that the battery is not is subject to unintended activation.

15 Claims, 5 Drawing Sheets

RESERVE BATTERY HAVING SIMPLIFIED CONSTRUCTION AND IMPROVED RANGE OF OPERATION

FIELD OF THE INVENTION

This invention relates to the field of reserve, energy sourced, or deferred action batteries. More specifically, the reserve battery of the present invention provides a simplified construction, wide operating temperature range and replaceable battery cell and electrolyte reservoir module.

PROBLEM

It is common to have a need to operate a device requiring electrical power at locations remote from an electrical power source. This need might arise with a device having no electrical power source of its own, such as a radio. The need might also arise with respect to devices which have an electrical power source but, for some reason, that source is discharged or not operating properly. Examples of this include automobiles, boats, or recreational vehicles.

A common problem encountered by motorists is an automobile that will not start due to the battery being discharged to the point that there is not enough power available to operate the car's electric starting motor. Typically the car's headlights have been left on or some component of the car's charging system has failed.

There are various steps commonly taken in response to the situation of a "dead" battery. One option for a car with a manual transmission is to "push" start the car. This requires physical strength or another vehicle to get the car rolling so that the clutch can be engaged. It also requires employing at least one other person to assist and sufficient space in front of the car to allow for the push start operation. Even with all the proper conditions, the act of pushing a car by hand or with another vehicle can be an exceedingly unsafe act. Another common remedy for a dead battery is to use a jumper cable to provide power to the discharged battery from a battery which is not discharged, typically a battery in another car. This can also be a hazardous operation since there is a risk of reversing the polarities of the two ends of the jumper cable. This can result in a damaging short circuit of the car's electrical system and can even cause the battery to explode. This also requires the motorist to open the hood of their car to work in the engine compartment, something that many motorists are not comfortable in doing.

Another alternative for the stranded motorist is devices utilizing packs of rechargeable nickel-cadmium batteries. Given ideal conditions these charging devices can be used successfully to recharge a dead battery, however, serious defects limit their practical use. The nickel-cadmium batteries experience a high rate of discharge in storage therefore the batteries must regularly be recharged. Also, even when the nickel-cadmium batteries are fully charged, the batteries may be ineffective at recharging a dead automobile battery in cold weather conditions. The same can be said for common household batteries used for the same purpose.

U.S. Pat. No. 4,794,058 to Theiss (1988) and U.S. Pat. No. 4,925,750 also to Theiss (1990) describe a reserve battery system with the intended application of charging a discharged car battery. The system includes a housing surrounding a plurality of battery cells, an electrolyte reservoir positioned above the battery cells, and a fluid passageway between the interior of the electrolyte reservoir and the battery cells. The fluid passageway is designed with a frangible portion which breaks when the necessary force is applied to an actuating means. With the frangible portion broken, electrolyte flows from the electrolyte reservoir through the fluid passageway and to the battery cells thus activating the battery. There are several drawbacks to this system. First, the electrolyte for each cell is provided from a single electrolyte reservoir. The result is a potential for shorting the various battery cells together during activation of the battery when the electrolyte may provide an electrical path between two or more battery cells. This will, at a minimum, degrade the performance of the activated battery. Another drawback is that the device, tall and cylindrical in shape, must be kept relatively flat during activation to ensure that each cell receives its necessary allotment of electrolyte from the electrolyte reservoir. This is not always possible when activating the battery and is a need not likely to be understood or appreciated by the user. Still another drawback is the relative complexity of this device and the lack of any means to assure that the battery cannot be activated through an inadvertent means. A further limiting aspect of this device is the lack of any means for heating the electrolyte fluid. This can be important as a battery's power output is degraded by cold temperatures. These patents also describe a current regulating means associated with a reserve battery system as well as the use of LEDs to communicate to the user certain status information during the battery activation and charging process.

U.S. Pat. No. 4,699,854 to Snyder (1987) describes a reserve battery with a single cell and a separate electrolyte reservoir. One means described for activating the battery include an electro-explosive primer used to break an electrolyte containing ampule in combination with a source of pressurized gas. When the electro-explosive primer is energized, thereby breaking the ampule, the electrolyte is forced under pressure into the cell compartment.

U.S. Pat. No. 4,803,924 to Von Sloun (1988) describes a manual activator for a reserve battery system. The manual activator includes a lever connected to a cam, the cam being positioned to break an ampule when the lever is pivoted. The activation system described is bulky and intended to release electrolyte only from a single storage reservoir.

U.S. Pat. No. 4,650,732 to Weber (1987) describes a reserve battery system with a means for heating the electrolyte. The system includes a solid propellant gas generator as a heat source which is connected to a heat exchanger. The electrolyte is made to flow through the heat exchanger as it is transported to the battery cell compartments. Although likely suitable for the military application intended, this system is not appropriate or cost-effective for the application intended for the present invention.

There remains a need for a reserve battery which is of simple, compact construction, easy to use, and capable of operation at low ambient temperatures. Additionally, there remains a need for a reserve battery which will operate as designed with minimal regard for the physical positioning of the battery during battery activation and with no risk of reduced performance due to electrolyte induced shorting during battery activation. There exists a further need for a reserve battery with a mechanism to avoid inadvertent activation.

SOLUTION

The present invention overcomes the problems of the prior art by providing a reserve battery system which is simply constructed and easy to use. Additionally, the reserve battery of the present invention is operable over a wide range of operating temperatures and will reliably deliver the intended charge regardless of its orientation during use. A further advantage of the present invention is that it provides a locking mechanism to ensure that the reserve battery does not activate until the user intends.

A reserve battery of the present invention includes a low-cost replaceable cell module and a reusable electronic control module. The electronic control module contains circuitry for controlling the charging process and for communicating information to the user regarding the status of the charging process. The cell module contains a plurality of cells. Each cell contains a plate assembly and electrolyte which, until the battery is activated, is stored in an electrolyte reservoir in such a fashion that the electrolyte does not come into contact with the battery plate.

The cell module is comprised of a housing base which defines a plurality of cells with each such cell containing a plate assembly. Each plate assembly includes negative plates, separators, and positive plates. The plate assembly of each separate cell is electrically connected in serial fashion to the plate assembly in the adjacent cell compartments. Positive and negative terminals of the reserve battery system extend from the extreme positive and negative plates of the series connected battery plate assemblies. A housing cover is attached to the housing base to form a separate cell compartment for each plate assembly. The housing cover contains a separate electrolyte reservoir for each separate cell. The electrolyte reservoir is sealed so the electrolyte does not come into contact with the plate assembly. The battery may be maintained for a very long period of time, for example at least five years, in this condition as the energy stored in the electrolyte and plate assemblies is not drained or depleted over time.

A reserve battery of the present invention can be used to power any device requiring electrical power, such as a radio or a car battery. Recharging a discharged car battery is a common problem and one that is the focus of a preferred embodiment of the present invention.

When the user has a need for the energy stored in the reserve battery, the user will activate the battery. Activation of the battery may be done manually or automatically. This is accomplished by the user first inserting a plug connected to the reserve battery system into the cigarette lighter portal of the car with the discharged battery. The user then depresses a mechanical activation switch on the electronic control module panel. Alternatively, an automatic activation system could be used to activate the battery. Remote activation of the battery is also possible. Activation of the system releases spring-loaded cutter bars located in the cell modules. Upon release, the springs move the cutter bars causing them to puncture and tear away the sealing means on each of the electrolyte reservoirs thereby rupturing all of the electrolyte reservoirs. The electrolyte fluid then flows downward from the electrolyte reservoirs and contacts the plate assemblies thus completing the battery circuit. A voltage potential then exists between the positive and negative terminals of the reserve battery which causes current flow through the connecting wire to the cigarette lighter portal and to the car's primary battery.

In a preferred embodiment of the present invention each of the electrolyte reservoirs contains two chambers. The two chambers contains different electrolyte fluids which when mixed react exothermically and, in addition to producing heat, result in the necessary final electrolyte for proper operation of the battery. The heat produced by the mixing of the two electrolytes allows the battery to activate and operate successfully even in cold temperature conditions.

Also, in a preferred embodiment of the present invention, a locking mechanism is provided to ensure that the activation means is not triggered inadvertently, such as through normal road vibrations while stored in the trunk of an automobile or under the automobile seat. The locking mechanism is part of the activation means of the reserve battery. Another feature of the present invention is an improved means for transmitting force from the activation switch, when depressed by the user, to the spring loaded cutter bars. This is important because the force must be transmitted in a way that the battery cell module remains sealed, not allowing any electrolyte fluid (sulfuric acid) to escape from the reserve battery.

Other salient features, objects, and advantages will be apparent to those skilled in the art upon a reading of the discussion below in combination with the accompanying drawings.

DETAILED DESCRIPTION OF THE PREFERRED EMBODIMENT

Figure 1:
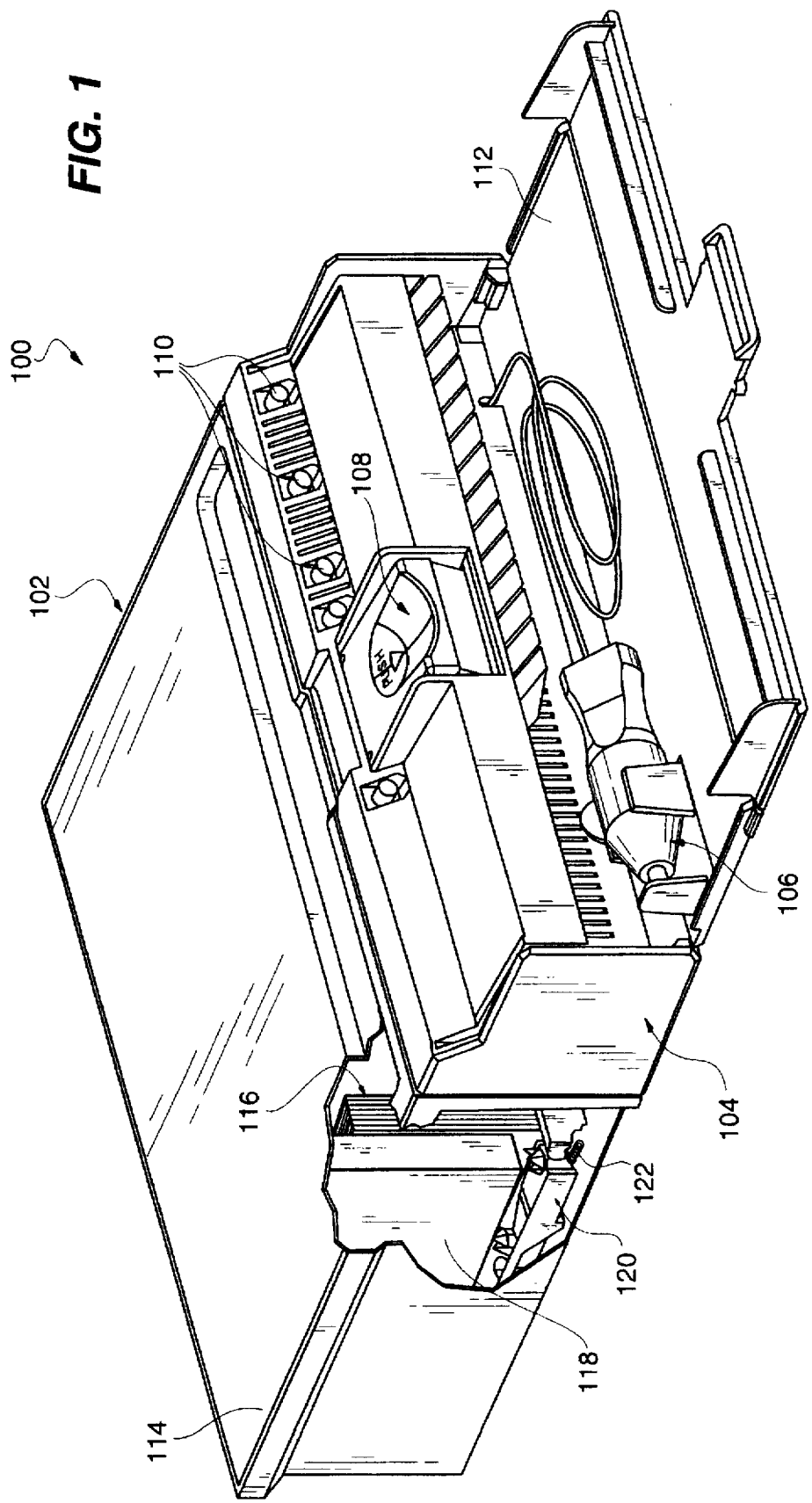
FIG. 1 depicts the assembled reserve battery system having a cut away view of one cell of the reserve battery system.

FIG. 1 depicts a reserve battery system 100. The major components of reserve battery system 100 include cell module 102 and electronic control module 104 having control module cover 112. Electronic control module 104 is removably attached to cell module 102 using locking tabs (not shown). Reserve battery system 100 also includes activation button 108, plug 106, control module cover 112, and battery status LEDs 110. FIG. 1 is cut away on one side to reveal a cell 114. Each cell 114 contains a plate assembly 116, an electrolyte reservoir 118, a cutter bar 120, and a cutter bar spring 122. The present invention utilizes nine such cells 114 electrically connected in series as described below to generate power in reserve battery system 100. Cell module 102 is a completely sealed unit such that the internal components, in particular the electrolyte fluid, cannot escape during normal use. This is important as the electrolyte fluid is composed primarily of sulfuric acid. The intended use of the present invention includes storage under the seat or in the trunk of one's automobile therefore the need for cell module 102 to be sealed is apparent.

Figure 2:
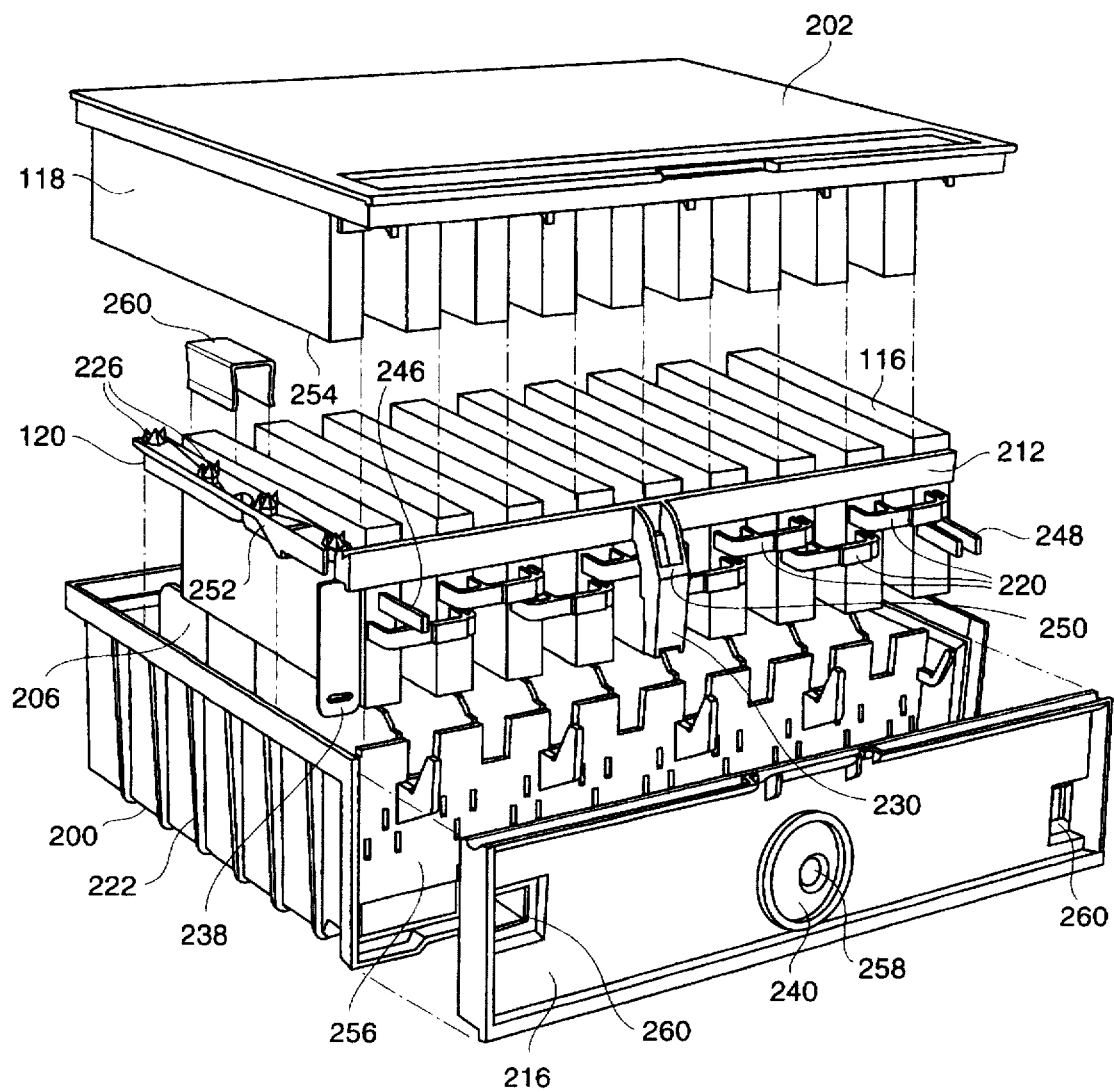
FIG. 2 is an exploded view illustrating the major components of the reserve battery with the electronic control module removed.

The description of the detailed features of the preferred embodiment are made more clear by first describing the general construction and operation of reserve battery system 100 with respect to FIGS. 1 and 2. FIG. 2 is an exploded view of reserve battery system 100 depicting its components in greater detail. Reserve battery system 100 is first described with respect to its non-activated, or storage, state. Activation of reserve battery system 100 is then described.

Figure 6:
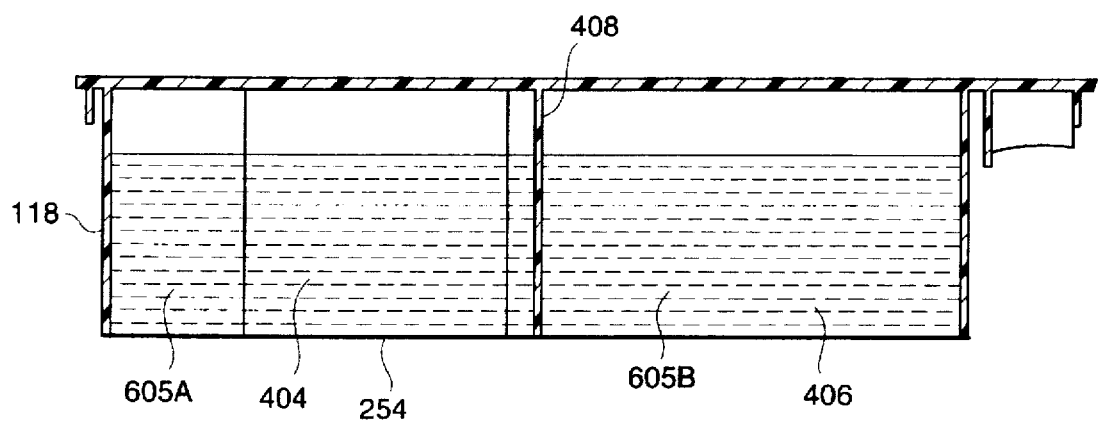
FIG. 6 depicts a cut away side view of the housing cover illustrating composition of the electrolyte reservoirs.

Each cell 114 is separated from the adjacent cell 114 by a wall 206. Walls 206 are formed as part of housing base 200. As described above, each cell 114 contains three basic components; a plate assembly 116, an electrolyte reservoir 118 filled with an electrolyte fluids 605a and 605b, as depicted in FIG. 6, and a cutter bar 120. The preferred embodiment contains nine cells 114. Each cell 114 develops a voltage potential across the cell 114 of about 2 volts. Thus when the nine cells 114 of the preferred embodiment are electrically connected in series, a total voltage of about 18 volts exists between the positive terminal 246 and negative terminals 248 of reserve battery system 100.

Plate assembly 116 is positioned within cell 114 so as to be aligned parallel relative to base side wall 222. Each plate assembly 116 is serially connected with adjacent plate assemblies 116 through conductors 220. The composition of plate assemblies 116 is described in more detail with respect to FIG. 5 below. In each cell 114, electrolyte reservoir 118 extends downward from housing cover 202 so that electrolyte reservoir 118 is located adjacent to plate assembly 116. Reservoir seal 254 seals the bottom surface of electrolyte reservoir 118 so that electrolyte fluids 605a and 605b are maintained within electrolyte reservoir 118. The operation and location of reservoir seal 254 is understood more clearly with respect to FIG. 4 and its associated description.

Cutter bar 120 is located within each cell 114 adjacent to plate assembly 116 and is oriented such that cutters 226 are pointed upward towards reservoir seal 254. In the preferred embodiment, cutter bar 120 and cutters 226 are formed from styrene or other acrylic plastic in order to provide the necessary stiffness for cutter bar 120 and to ensure that cutters 226 can be made sufficiently sharp to perform the necessary puncture and cutting operations. Cutters 226 are shaped so as to puncture reservoir seal 254 when brought into contact with reservoir seal 254. In the nonactivated state of reserve battery system 100, cutter bars 120 are positioned below reservoir seals 254 such that cutters 226 do not contact reservoir seals 254. Each cutter bar 120 has an associated cutter bar spring 122 which is compressed in the non-activated state of reserve battery system 100. In each cell 114, cutter bar spring 122 is located between a face 256 of housing base 200 and a surface of cutter bar 120 nearest face 256. Cutter bar spring 122 tends to force cutter bar 120 up towards electrolyte reservoir 118 and in a direction away from face 256. With reserve battery system 100 in the non-activated state, the force of cutter bar springs 122 is counteracted by the stationary position of lever 212 acting on cutter bars 120 through fingers 238. Lever 212 is held stationary in the non-activated state of reserve battery system 100 by a catch (not shown) on the back side of face 216 which engages surface 250 of lever tab 230. Each cutter bar 120 is connected at its end closest to face 256 to a finger 238. Fingers 238 extend downward from and are fixedly attached to lever 212. For simplicity, only a single finger 238 is shown in FIG. 2 although there is actually one finger per cell 114.

Figure 3:
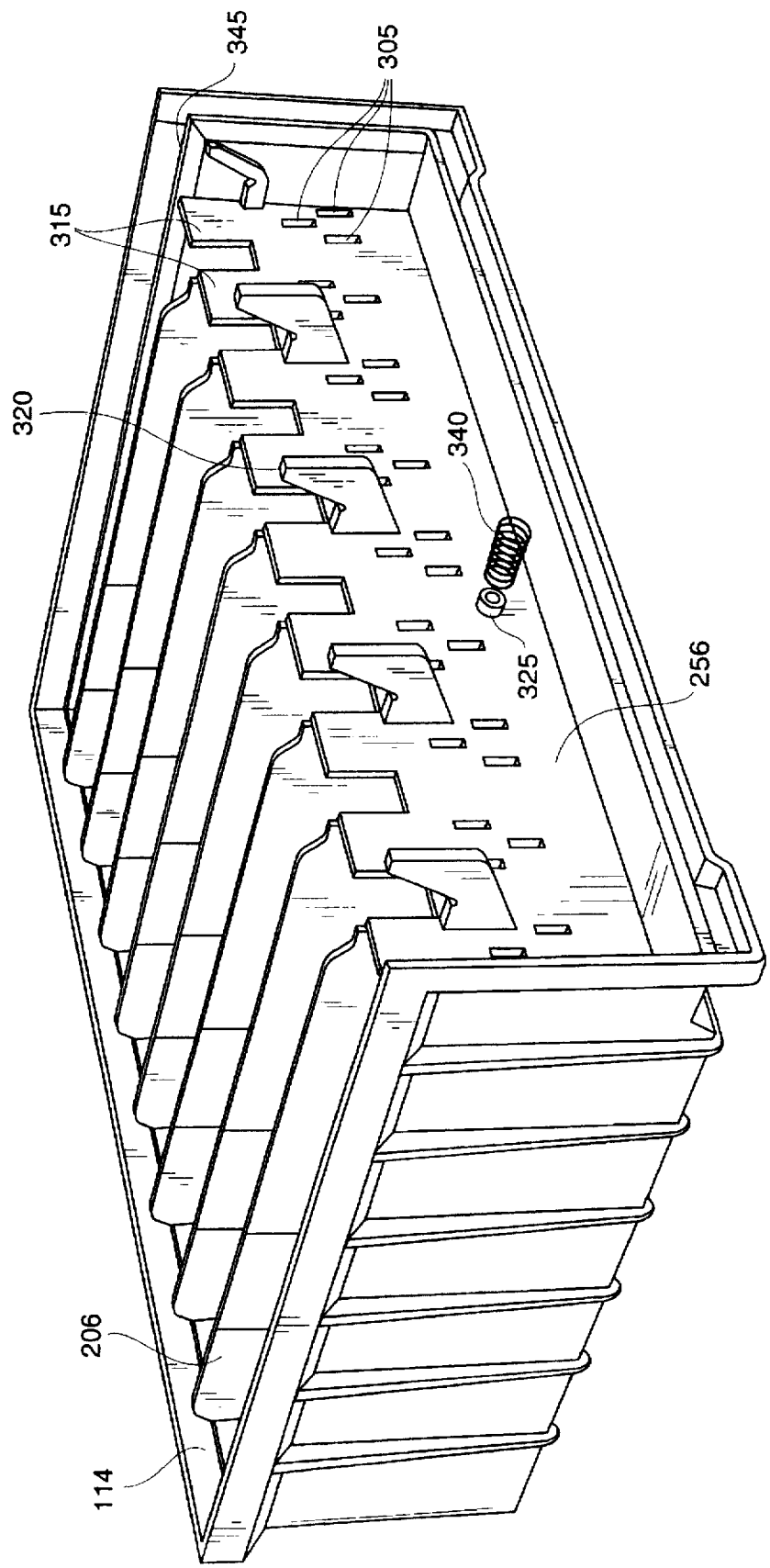
FIG. 3 depicts the housing base in detail.

With reference to FIGS. 2 and 3, Lever tab 230 of lever 212 is used for two important functions. First, lever tab 230 is one of the components necessary to the activation of reserve battery system 100. In the non-activated state of reserve battery system 100, however it is important that lever tab 230 be held in place without any movement in order to avoid unintended activation of reserve battery system 100. This is important since, for example, a reserve battery of the present invention might be stored in the trunk of an automobile until it is needed and might during that time experience significant shock through bouncing, vibration, and extreme temperature conditions. Therefore, lever tab 230 is acted upon by the force of tab spring 340 which is compressed between spring holder 325 and lever tab 230 such that lever tab 230 is held adjacent to the back surface of face 216 at the approximate location of a dome 240 in face 216. Dome 240 is formed in face 216 and is made of the same polypropylene material as face 216. In the non-activated state of reserve battery 100, dome 240 has a convex shape from the view provided by FIG. 2. A nipple 258 located in the center of dome 240 is formed with a concave shape.

Cell module 102 is sealed to prevent the contents of cells 114 from escaping from cell module 102 into electronic control module 104 or to the exterior of reserve battery system 100. Such sealing is accomplished by fixedly attaching lip 409 (shown in FIG. 4), which surrounds the top surface of housing cover, using a suitable adhesive or weld, to top surface 345 of housing base 200 and top surface of face 216. This provides an uninterrupted seal between housing base 200 and housing cover thereby substantially encasing the contents of cells 114 within cell module 102.

The above description relates to the non-activated state of reserve battery System 100. Reserve battery system 100 must be activated when one wishes to utilize reserve battery system 100 to recharge a discharged automobile battery or to utilize the available stored energy of reserve battery system 100 in any way. The following description of the activation of reserve battery system 100 helps the reader to more fully understand the operation of the present invention.

To use reserve battery system 100, the user first inserts plug 106 into the cigarette lighter receptacle (not shown) of the vehicle having a discharged battery. Through circuitry known to those skilled in the art, an LED 110, on electronic control module 104 lights to notify the user of a successful connection between reserve battery system 100 and the discharged automobile battery.

To activate reserve battery system 100, the user depresses activation button 108 so that activation button 108 impinges on nipple 258 in convex shaped dome 240. The force of activation button 108 acting on convex shaped dome 240 causes convex shaped dome 240 to reverse its shape, i.e., to take on a concave shape as viewed from FIG. 2. The operation of dome 240 is important because it transmits the force from activation button 108 through dome 240 to the rest of the activation system without breaking the seal formed by face 216. Face 216 is heat sealed to housing base 200. Positive terminal 246 and negative terminal 248 extend through cutouts 260 in face 216. The openings formed by cutouts 260 are closed through the use of an epoxy potting material which is poured into cutouts 260 after face 216 is heat sealed to housing base 200. When dome 240 "pops" in the reverse direction to take on a concave shape, nipple 258 contacts lever tab 230 causing lever tab 230 to release from its catch.

When lever tab 230 is released from its catch, cutter bar springs 122 are able to act on cutter bars 120. Cutter bar springs 122 force cutter bars 120 away from face 216. However, curved surface 252 of cutter bar 120 cooperating with a like surface, not shown, in base 200 also cause cutter bars 120 to be ramped upward toward reservoir seals 254. The spring-driven motion of cutter bars 120 brings cutters 226 into contact with reservoir seal 254, first puncturing then tearing reservoir seal 254. Cutter bars 120 are formed to facilitate the draining of electrolyte fluids 605a and 605b as they escape from electrolyte reservoirs 118 through a combination of downward curving surfaces and drains formed in the surface of cutter bars 120.

With reservoir seal 254 punctured and torn by cutters 226, electrolyte fluids 605a and 605b flow from electrolyte reservoir 118 and come into contact with plate assembly 116.

Figure 5:
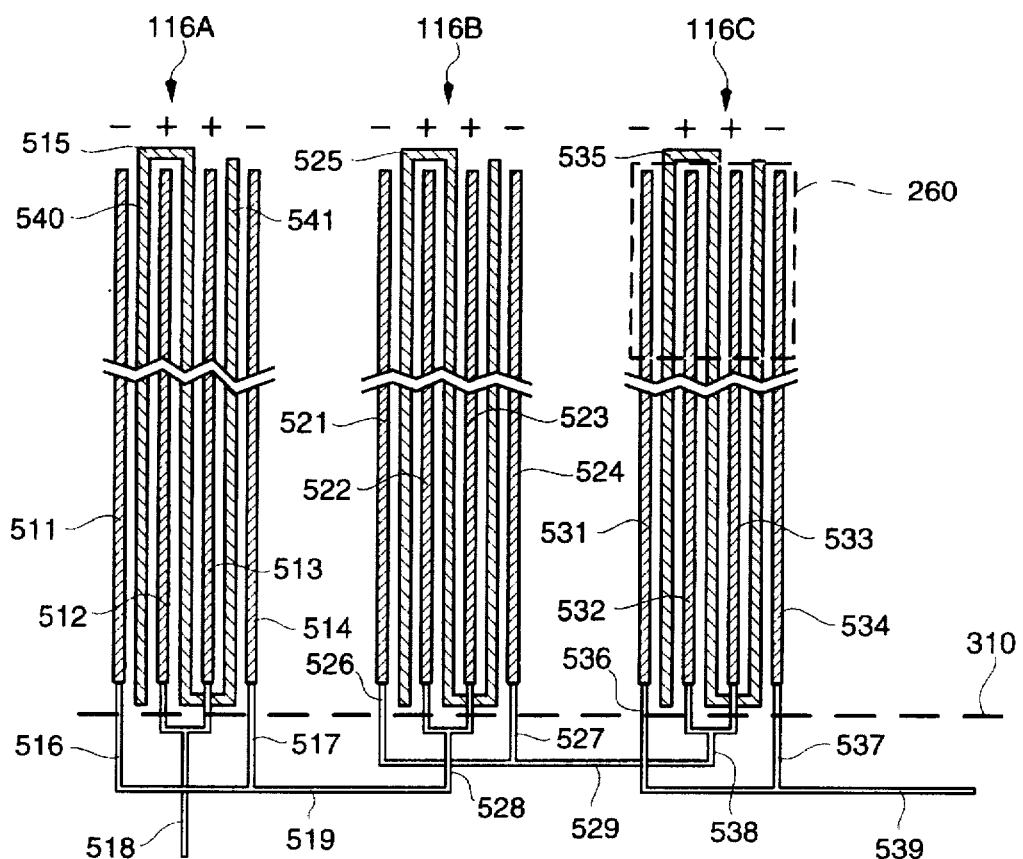
FIG. 5 is a detail illustrating several cell assemblies and their interconnections.

Through operation described with respect to FIGS. 5 and 6, electrolyte fluids 605a and 605b are absorbed by plate assembly 116. With the contact between plate assembly 116 and electrolyte fluids 605a and 605b, reserve battery system 100 is activated and an electrical voltage differential develops between positive terminal 246 and negative terminal 248 of approximately 18 volts. Current then flows from reserve battery system 100 to the discharged automobile battery as indicated to the user in a known way by a second and third LED 110 on electronic control module 104. The lighting of a third LED 110 indicates to the user that reserve battery system 100 has sufficiently charged the discharged automobile battery and that the user may attempt to start their car. The delivery of current from reserve battery system 100 to the discharged battery of an automobile is limited to a level which does not exceed the current rating of the cigarette lighter fuse, typically 10 amps.

FIG. 3 depicts housing base 200 in greater detail. With respect to FIGS. 2 and 3, the preferred embodiment of the present invention utilizes a total of nine cells 114. Each cell 114 is separated from adjacent cells 114 by cell walls 206. Face 256 has conductor holes 305 formed to allow conductors 220 to pass through for connecting plate assemblies 116 in adjacent cells 114 and to connect the necessary cells 114 to electronic control module 104. The upper edge of face 256 includes base teeth 315 through which fingers 238 of lever 212 pass from one side of face 256 to the other. Arms 320 provide support to lever 212 which rests in arms 320. Spring holder 325 locates tab spring 340 on face 256 for proper alignment with lever tab 230. Housing base 200 is fabricated from a material such as battery grade polypropylene which is capable of providing the necessary strength and rigidity for the application of reserve battery system 100 and is not degraded by contact with sulfuric acid, the primary constituent in electrolyte fluids.

Figure 4:
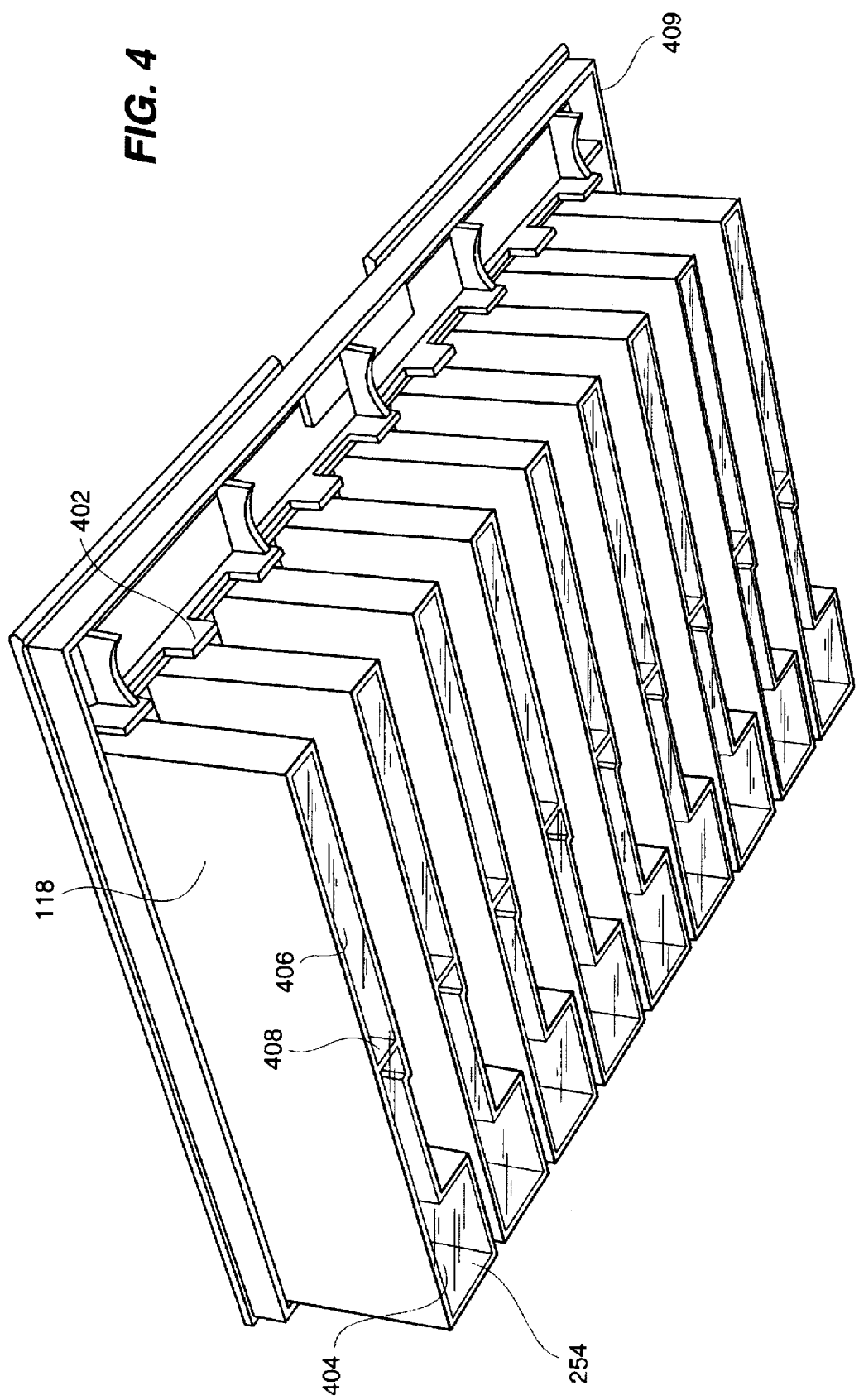
FIG. 4 depicts a bottom view of the housing cover in detail.

FIGS. 4 and 6 depict housing cover 202 in more detail. Cover teeth 402 mesh with base teeth 315 so as to minimize the openings in face 256 through which electrolyte fluid 605a and 605b might flow. Electrolyte reservoirs 118 are each comprised of a first chamber 404 and a second chamber 406 separated by a wall 408. After electrolyte fluid 605a is placed in first chamber 404 and electrolyte fluid 605b is placed in second chamber 406, reservoir seal 254 is heat sealed over the open ends of electrolyte reservoirs 118. Reservoir seal 254 is comprised of a polypropylene membrane unaffected by contact with sulfuric acid but subject to rupture by cutters 226 upon activation of reserve battery system 100. With reservoir seal 254 in place, electrolyte fluid 605 is contained within first chamber 404 and electrolyte fluid 605b is contained within second chamber 406. Wall 408 and reservoir seal 254 ensure that electrolyte fluid 605a in first chamber 404 does not contact electrolyte fluid 605b in second chamber 406. Reservoir seal 254 also ensures that electrolyte fluids 605a and 605b do not contact plate assemblies 116 until reserve battery system 100 is activated.

In the present invention, first chamber 404 is filled with electrolyte fluid 605a comprised of sulfuric having a specific gravity of approximately 1835 specific gravity units (SGU) while second chamber 406 is filled with electrolyte fluid 605b comprised of sulfuric acid having a specific gravity of approximately 1.210 SGU. The specific gravities are selected such that the mixture of electrolyte fluid 605a and electrolyte fluid 605b produces heat and a final electrolyte solution comprised of sulfuric acid having a specific gravity within a range of approximately 1.39 to 1.40 SGU. The heat produced at the time of mixing first and second electrolyte solutions 605a and 605b allows reserve battery system 100 to activate and provide an appropriate charge even at low ambient temperatures, such as −20 degrees F. For example, when electrolyte fluid 605a and electrolyte fluid 605b are stored at −20 degrees F, as might occur in an automobile during the winter, the temperature of the final mixture of electrolyte fluid 605a and electrolyte fluid 605b is about 90 degrees F. shortly after mixing occurs. The increased temperature of the electrolyte mixture heats the plate assemblies 116 as well with the result being a stronger chemical reaction between the electrolyte mixture and plate assemblies 116. A stronger and more vigorous chemical reaction means more power is available from reserve battery system 100.

FIG. 5 details three plate assemblies 116 and the interconnections therebetween. Three out of a total of nine plate assemblies 116 are shown. Plate assembly 116a in FIG. 5 represents the left-most plate assembly 116 as viewed in FIG. 2. As seen in FIG. 5, plate assembly 116a is actually a sandwich comprised of a first negative plate 511, a first separator leg 540, a first positive plate 512, a second separator leg 515, a second positive plate 513, a third separator leg 541, and a second negative plate 514. The construction of assemblies 520 and 530 are the same as assembly 510. Separator legs 540, 515, and 541 are actually just different sections of a single piece of separator materials that wraps, as shown in FIG. 5, around the positive and negative plates. One skilled in the art will recognize that three separate pieces of separator material could be used instead of the single piece depicted in FIG. 5.

The first positive plate 512 and second positive plate 513 extend through one of holes 305 in face 310 and are joined by positive terminal 246. Since plate assembly 116a is the plate assembly 116 at an extreme end of the series of 9 plate assemblies 116, the voltage at positive terminal 246 is the positive voltage output of reserve battery system 100. When electronic control module 104 is connected to cell module 102, electrical contact is made between positive terminal 246 and the electronic control module 104 such that current is transmitted through electronic control module 104 to whatever load might be applied to reserve battery system 100. Likewise, at the extreme opposite end of the series of plate assemblies 116, the negative voltage of reserve battery system 100 is conducted to negative terminal 248 of reserve battery system 100.

Conductor 519 connects to both lug 516 of first negative plate 511 and lug 517 of second negative plate 514. Conductor 519 also connects to common lug 528 of a first positive plate 522 in plate assembly 116b and a second positive plate 523 in plate assembly 116b. In this fashion negative plates 511 and 514 of plate assembly 116a are connected with positive plates 522 and 523 of plate assembly 116b. In a similar fashion, negative plates 521 and 524 of plate assembly 116b are connected to positive plates 532 and 533 of plate assembly 116c through conductor 529. Through the connections as described, each plate assembly 116 is electrically connected in series with the adjacent plate assembly. Plate clip 260, shown in relation to assembly 116c and in FIG. 2, is used in each plate assembly 116 to hold the plates together for ease of manufacturing. Another important function of plate clip 260 is to compress the components of each plate assembly 116.

In the present invention, each of the positive and negative plates contained within plate assemblies 116 are comprised of standard 2.75% antimony dry-charged plates (as can be supplied by Teledyne Battery Products) and have dimensions of 2 inches by 4 inches. The separator material is a micro-porous absorptive fiberglass such as that produced by H & V under stock number BG 24017. Each of the positive and negative plates has a thickness of about 0.055'. When compressed by plate clip 260, the total thickness of each plate assembly 116 is about 0.5'.

When, at activation of reserve battery system 100, first electrolyte fluid and second electrolyte fluid is released from electrolyte reservoirs 118, the battery plates and separators absorb the electrolyte mixture. In this way the electrolyte mixture is brought into contact with the plates and, once absorbed, there is no longer any free flowing electrolyte fluid in cells 114. Each electrolyte reservoir 118 contains enough electrolyte fluid 605a and electrolyte fluid 605b one cell 114 stored in the proper proportion in first chamber 404 and second chamber 406. When reserve battery system 100 is activated, each plate assembly 116 absorbs its allotment of electrolyte mixture with no electrolyte fluid remaining in free flowing, unabsorbed form.

It is to be expressly understood that the claimed invention is not to be limited to the description of the preferred embodiment but encompasses other modifications and alterations within the scope and spirit of the inventive concept.

We claim:

1. A reserve battery comprising:

a plurality of cells each of which has a plate means, a plurality of independent electrolyte fluid-containing reservoir means wherein each one of said cells has associated with it one of said independent electrolyte fluid-containing reservoir means, activation means common to all of said cells; and a means responsive to said activation means for causing each of said plurality of reservoir means to release its respective said electrolyte fluid wherein said electrolyte fluid from each of said independent reservoir means contacts said plate means in the respective said cell.

2. The reserve battery of claim 1 wherein said reservoir means comprises:

a first chamber containing a first electrolyte component of said electrolyte fluid, a second chamber containing a second electrolyte component of said electrolyte fluid; and wherein upon operation of said activation means said first electrolyte component and said second electrolyte component combine to produce heat.

3. The reserve battery of claim 1 wherein said activation means comprises:

an activation button, an arm, a means, responsive to depression of said activation button, for transmitting force to said arm a means responsive to said arm for releasing said electrolyte fluid from said reservoir means wherein said electrolyte fluid contacts said plate means.

4. The reserve battery of claim 3 wherein said force transmitting means comprises:

a flexible dome formed in a sealed surface, said sealed surface located between said cells and the exterior of said reserve battery, wherein flexible dome is caused to strike said arm by changing from a convex shape to a concave shape in response to depression of said activation button.

5. The reserve battery of claim 3 wherein said means responsive to said arm in a cutter bar in each of said cells.

6. The reserve battery of claim 3 wherein said activation means further comprises:

a locking means cooperating with said arm, said locking means operating to prevent movement of said arm until said activation button is depressed.

7. The reserve battery of claim 6 wherein said locking means comprises:

a spring means engaged with said arm to hold said arm stationary and in a position adjacennt to said force transmitting means wherein the force of said spring means is overcome only in response to the depression of said activation button.

8. The reserve battery of claim 1 wherein said plate means further comprises at least one positively charged lead plate and at least one negatively charged lead plate.

9. A method of operating a reserve battery comprising the steps of:

providing a plurality of cells each of which has a plate means;

storing electrolyte fluid in a plurality of independent reservoir means wherein each one of said cells has associated with it one of said independent reservoir means; and operating an activation means to cause the release of said electrolyte fluid from each said reservoir means to its respective said cell wherein said electrolyte fluid from each of said plurality of reservoir means comes into contact with the respective said plate means in each respective said cell.

10. The method of claim 9 further comprising, storing a first electrolyte component of said electrolyte fluid in a first chamber of said reservoir means, and storing a second electrolyte component of said electrolyte fluid in a second chamber of said reservoir means, and producing heat by mixing said first electrolyte component and said second electrolyte component in response to the operation of said activation means.

11. The method of claim 9 wherein the step of operating said activation means further comprises the steps of:

locating a cutter bar in each of said cells, and connecting an arm to all of said cutter bars; and causing said cutter bars to release said electrolyte fluid by transmitting force applied to an activation button to said arm.

12. The method of claim 11 wherein the step of transmitting force further comprises:

forming a dome shape in a sealed surface located between said cells and the exterior of said reserve battery; and causing said dome to strike said arm in response to depression of said activation button by changing said dome from a convex shaped dome to a concave shaped dome.

13. The method of claim 11 further comprising locking said arm in place until said activation button is depressed.

14. The method of claim 13 wherein the locking step further comprises:

locating a spring to engage said arm in a stationary position; and overcoming the force of said spring to move said arm only when said activation button is depressed.

15. The method of claim 9 wherein the step of locating a plate means in each of said cells further comprises:

locating one or more positively charged plates in each of said cells; and locating one or more negatively charged plates in each of said cells.

* * * * *